Figure 1:
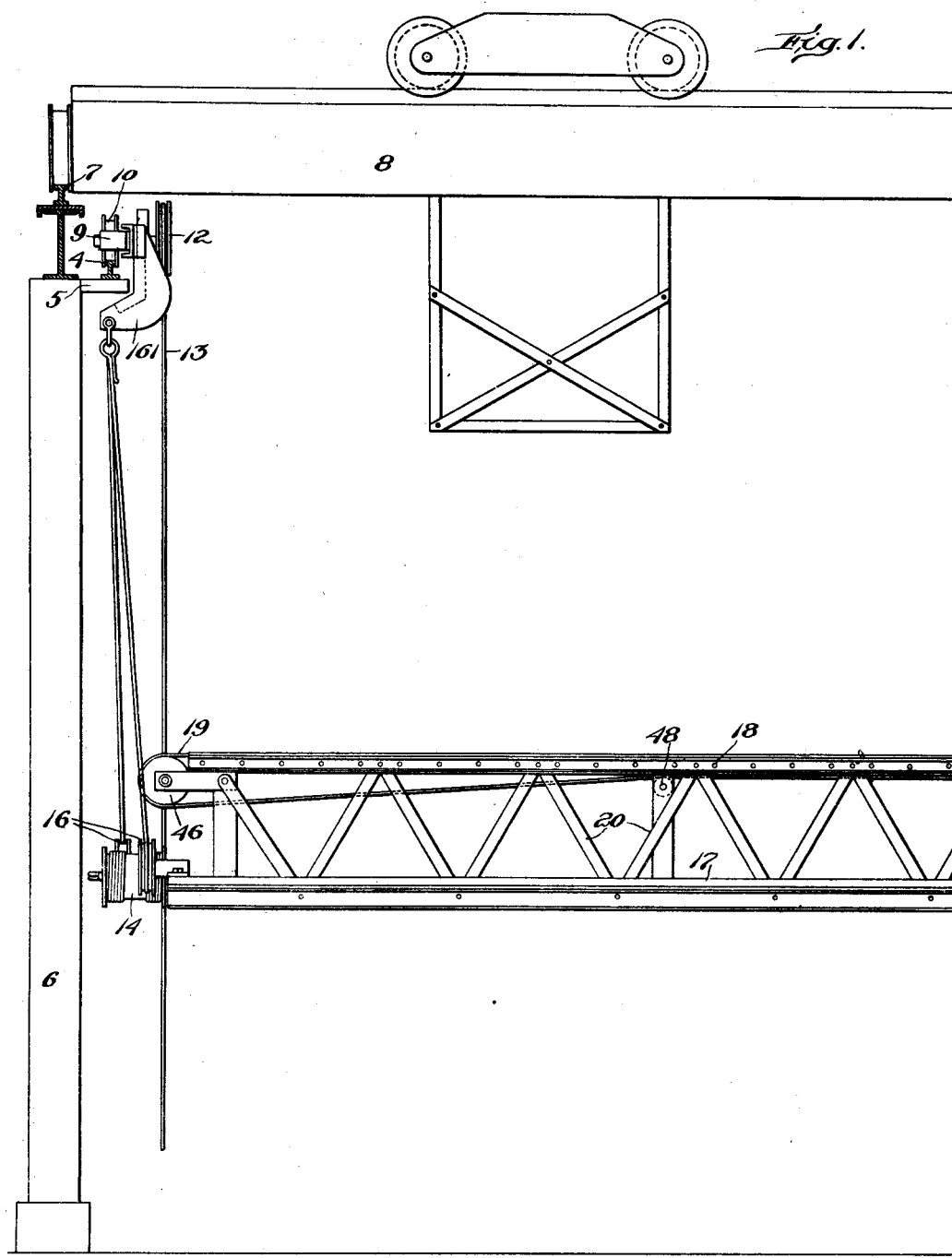
Figure 2:
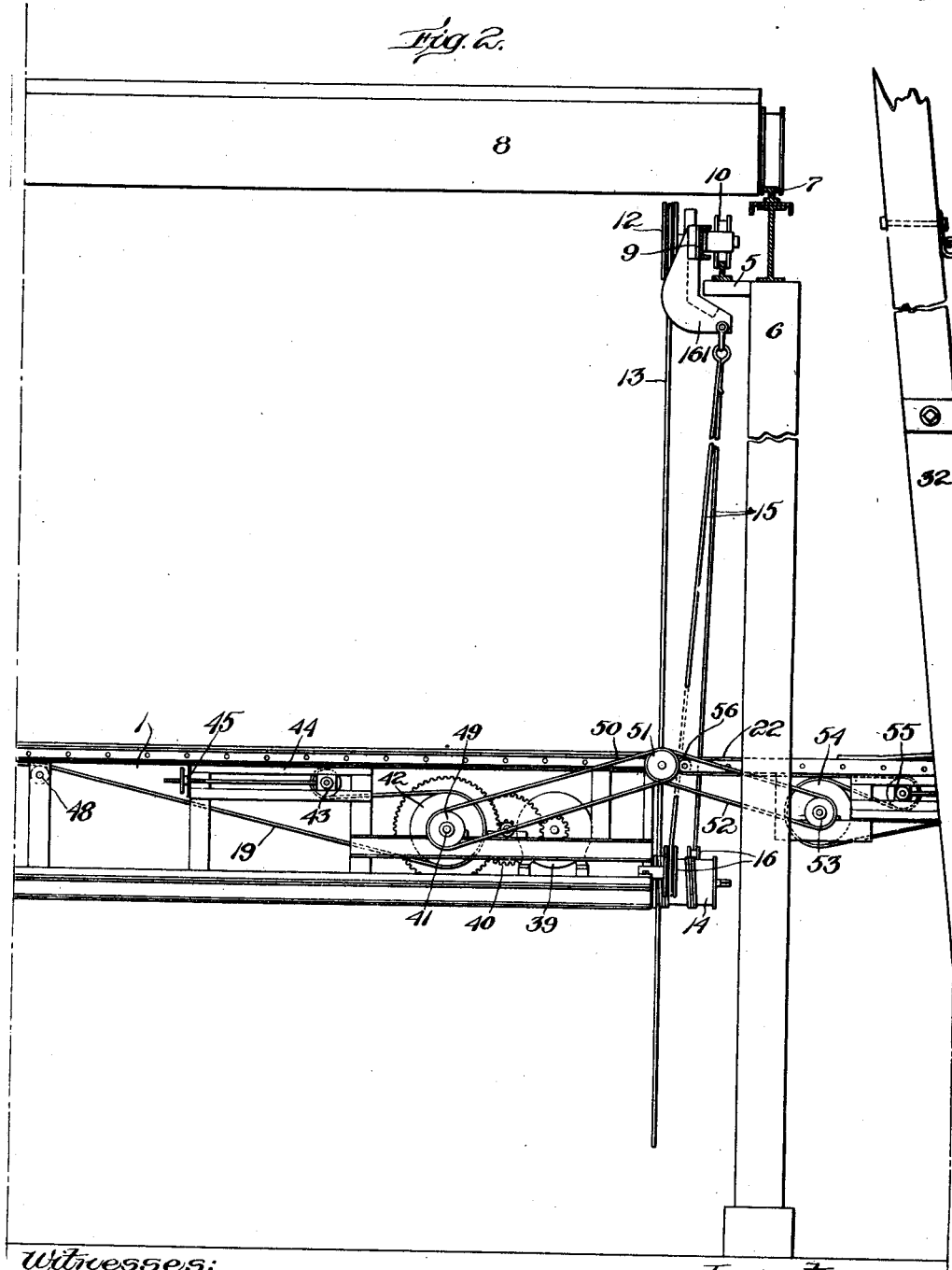
Figure 3:
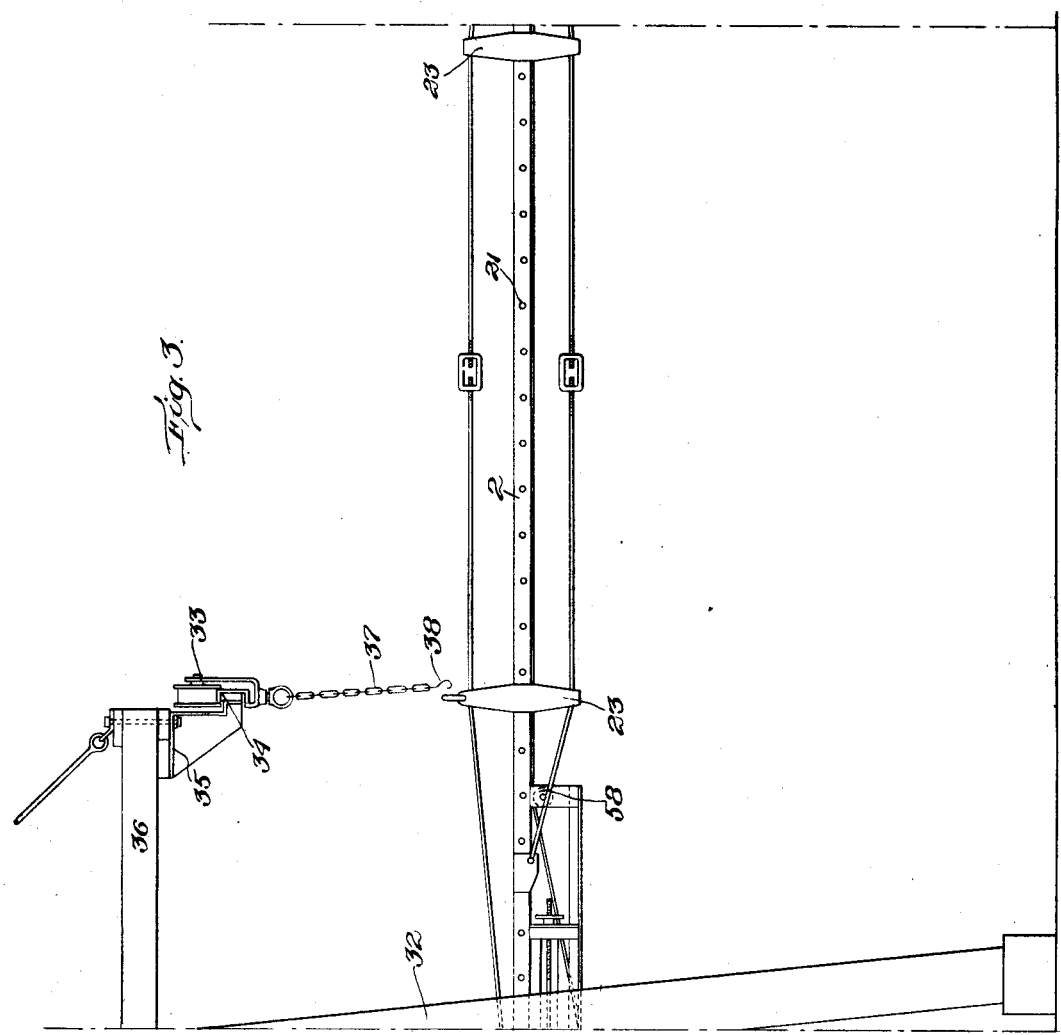
Figure 4:
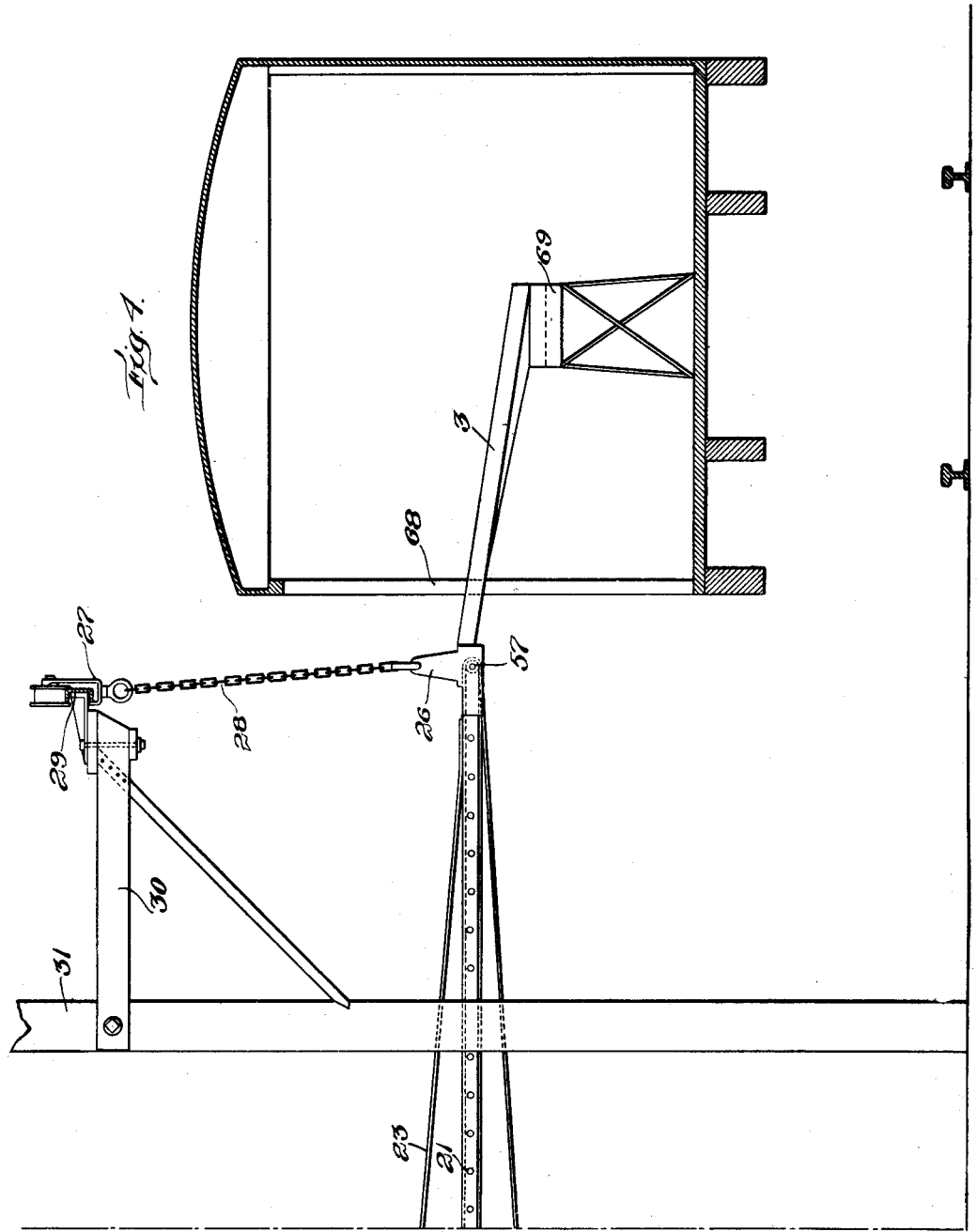

W. W. WALLACE.
BRICK LOADING APPARATUS.
APPLICATION FILED JAN. 10, 1911.

1,034,941.

Patented Aug. 6, 1912.
7 SHEETS—SHEET 3.

W. W. WALLACE.
BRICK LOADING APPARATUS.
APPLICATION FILED JAN. 10, 1911.

1,034,941.

Patented Aug. 6, 1912.
7 SHEETS—SHEET 5.

Witnesses:
Wm. J. Pike
Edward Maxwell

Inventor:
William W. Wallace,
by Geo. H. Maxwell, atty

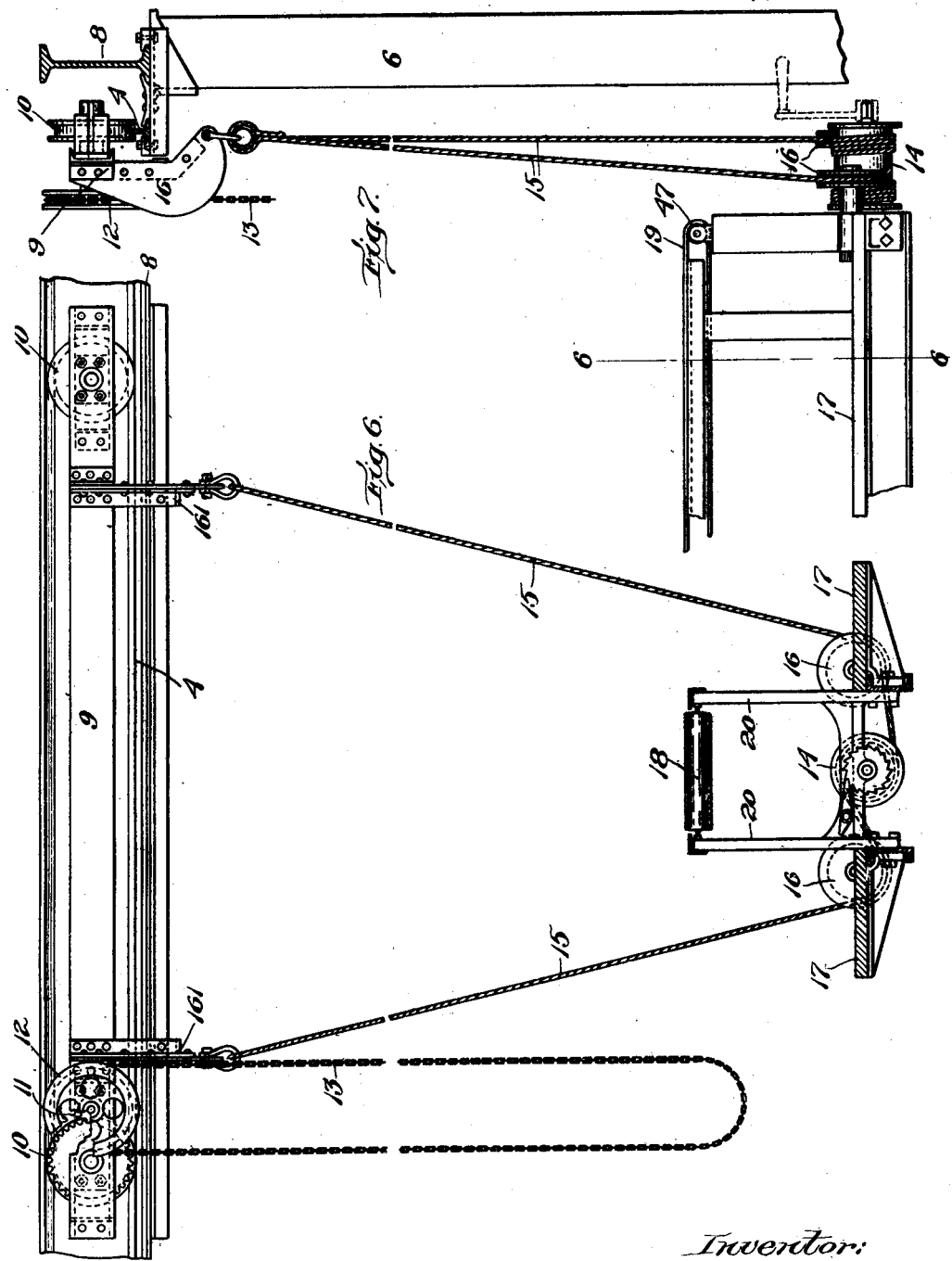

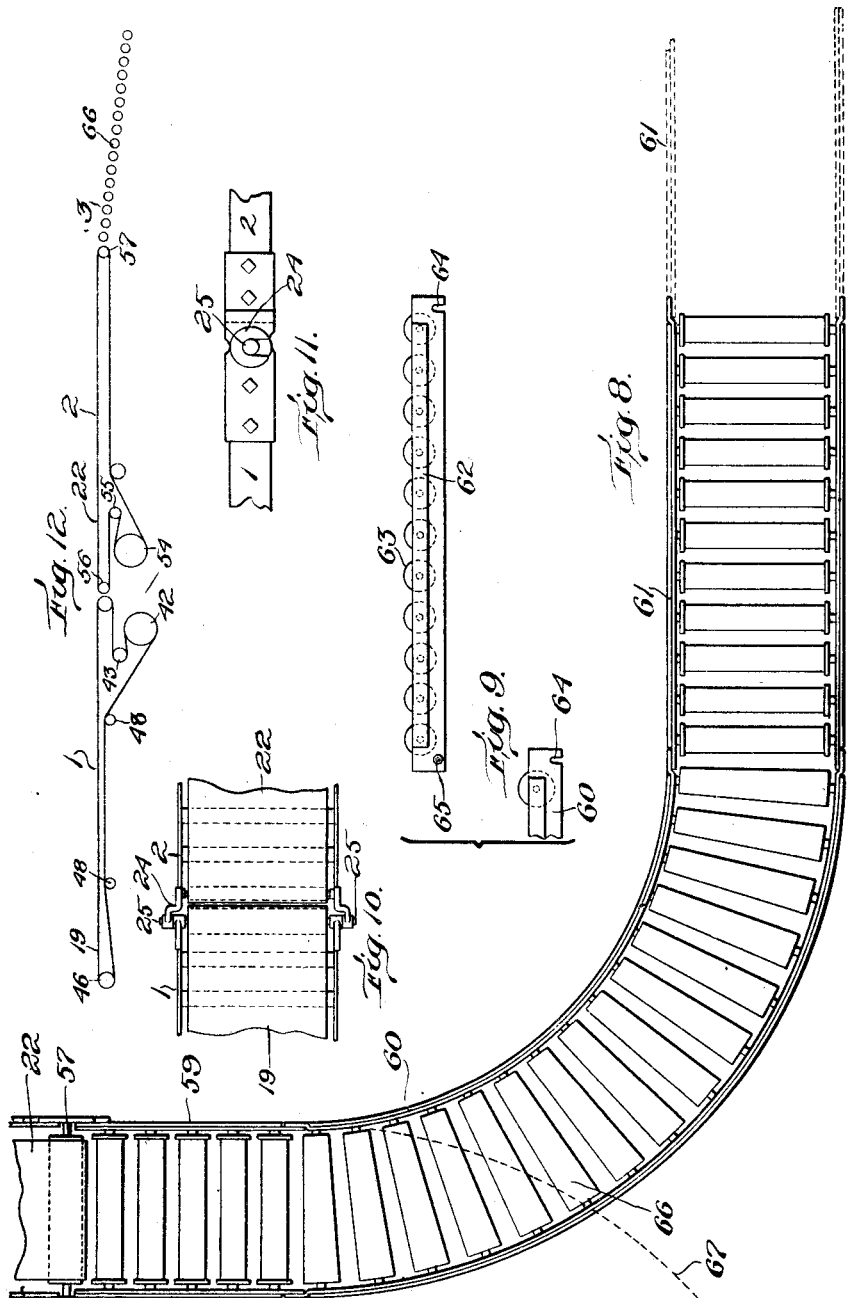

UNITED STATES PATENT OFFICE.

WILLIAM W. WALLACE, OF WILLOUGHBY, OHIO, ASSIGNOR TO RAMOND C. PENFIELD, OF NEW YORK, N. Y.

BRICK-LOADING APPARATUS.

1,034,941.　　　　　Specification of Letters Patent.　　Patented Aug. 6, 1912.

Application filed January 10, 1911. Serial No. 601,828.

*To all whom it may concern:*

Be it known that I, WILLIAM W. WALLACE, a citizen of the United States, residing at Willoughby, in the county of Lake and State of Ohio, have invented an Improvement in Brick - Loading Apparatus, of which the following description, in connection with the accompanying drawings, is a specification, like letters on the drawings representing like parts.

Handling bricks for loading the same at supply stations onto railroad cars, has heretofore been done almost exclusively by wheelbarrows, the bricks being handled from the kiln to the wheelbarrow and wheeled into the cars. A runway is usually placed about on the level with the car floor and a man is required to toss the bricks down to the wheelbarrow men when they are being taken from the top part of the kiln, or toss them up from the ground. This is a very laborious task and is one of the difficult classes of work for which to secure men on the brick yard. Various efforts have been made to take the bricks from the kiln by means of a gravity conveyer but this has made it necessary to handle the bricks from the lower portion of the kiln and get them up onto the conveyer as in order to work such a system it is necessary to keep the ends of the gravity conveyer which starts from the kiln shed, high enough to run the bricks along by gravity down into the car. A further difficulty with such a system is that when it is necessary to change position it takes time to move such a conveyer, and any one position into which it may be placed is only convenient for the taking on of a relatively small number of bricks, thus requiring either a considerable loss of time in frequent changing of the conveyer position or the carrying of the bricks for a considerable distance to the conveyer. In the present invention I have devised an arrangement whereby the loading end of the conveyer is quickly and easily adjustable to any vertical or transverse position in the brick kiln, and a suitable platform on which the operative may stand is adjusted in connection with such conveyer portion, so that this loading portion is always in close proximity to the bricks to be placed thereon from whatever part of the kiln they are to be taken.

My invention provides in connection with such quickly adjustable loading conveyer portion, an intermediate connecting portion, these two portions being preferably driven by a positive mechanism, and being connected by a flexible joint with a subsequent conveyer, preferably of a gravity type, which delivers the bricks into the desired part of the car being loaded. Such flexible joint between the loading portion and the delivery portion of the conveyer permits the vertical adjustment of the loading portion of the conveyer within the necessary limits to reach all the bricks in the kiln without disturbing the delivery portion of the conveyer appreciably, while the entire conveyer system is readily adjustable sidewise horizontally to bring the loading portion into the different transverse portions of the kiln.

My improved apparatus not only handles the bricks with greater facility and the saving of a large amount of labor, but also more carefully and with less breakage. In piling the bricks from a kiln into wheelbarrows, various handlers are careless and the bricks have to be piled on top of each other, while by my system the bricks are put onto a belt and are not piled over each other, and the multiple handling is done away with, thus avoiding chipping off the corners or otherwise injuring the bricks.

My invention will be fully understood by reference to the following detailed description in connection with the accompanying drawings, wherein—

Figure 5:
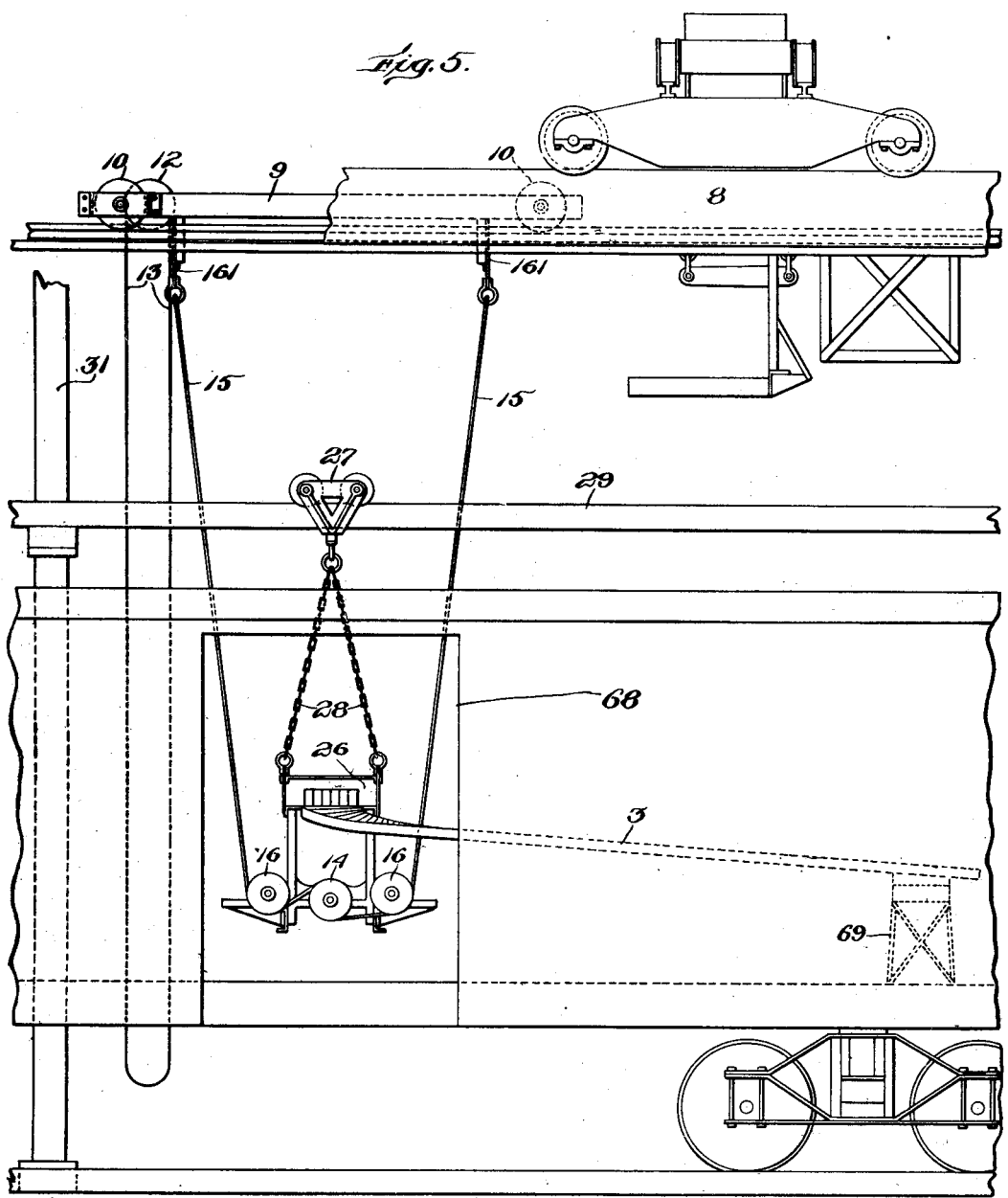

Figures 1, 2, 3 and 4 are complemental views which, together, arranged in the order stated, constitute a side elevation of the apparatus; Fig. 5 is an end view from the delivery end; Fig. 6 is a fragmentary section near the loading end on line 6—6 of Fig. 7; Fig. 7 is a fragmentary side elevation of one end of the loading platform and its support; Fig. 8 is a plan of the gravity delivery conveyer; Fig. 9 is a detail side view showing the manner of assemblage of the delivery conveyer portion; Figs. 10 and 11 are fragmentary plan and side elevations respectively, showing the connection between the loading portion and intermediate portion of the conveyer; and Fig. 12 is a diagrammatic view of the entire system.

The apparatus includes a loading conveyer portion 1, an intermediate conveyer portion 2, and a delivery conveyer portion 3. The loading portion 1 is supported from auxiliary tracks 4 secured on brackets 5 fixed to posts 6 in the brick kiln. These posts 6 are surmounted by main tracks 7 along which the main crane 8 used in setting bricks, is movable; this main crane is not used in the normal operation of the present apparatus but is utilized in connection with the system when it is necessary to pick up the brick loading conveyer portion and platform 1 and remove it from the brick kiln.

The tracks 4 extend horizontally along the length of the brick kiln at the upper portion thereof, and trolley supports 9 have flanged rollers 10 movable on said tracks. As a means for adjusting the trolley supports 9 and hence the loading conveyer portion 1 along the tracks 4, one or more of the rollers 10 of each trolley support has geared connection 11 with a sheave 12, around which an endless line 13 is passed, such line depending therefrom down to a point for convenient operation by an operative on the platform of loading portion 1. The loading portion and platform carried therewith is vertically adjustable by means of drums 14 journaled at the ends thereof, around which are adapted to be wound on the opposite sides the parts of suspension cables 15, these first passing around intermediate idlers 16 at some little distance to either side of the drums 14 as shown. The suspension cables 15 are supported from spaced apart depending brackets 16¹ on the trolley support 9, the separated relation of the cable portions 15 thus effecting stability of the platform 17 for the operative, carried by the loading portion 1.

The loading conveyer portion 1 comprises a bridge framework having at its top a roller belt support 18 for the loading conveyer belt 19, this being held in assembled relation with the platform 17, which extends at either side thereof at a somewhat lower elevation, by struts or braces 20. It is thus apparent that the loading conveyer portion and platform can be quickly adjusted to any desired vertical position by applying a crank to turn the drums 14, and that it can be likewise moved to any horizontal position in the kiln by manipulation of the lines 13 which control the movements of the trolley supports therefor.

The intermediate conveyer portion consists in a roller belt support 21 for a conveyer belt 22, this roller support being assembled with a supporting truss framework 23 and has an articulated connection with section 1 as by having hooks 24 engaged over pins 25 extending from the ends of the section 1. This intermediate conveyer portion is supported for pivotal and displaceable movement at its outer or delivery end by a bracket 26 suspended from a trolley support 27 by means of a chain 28. The trolley support 27 is movable along a track 29 secured to brackets 30 on posts, one of which is shown at 31, adjacent the railroad track. One of the posts of the kiln shed is shown at 32, and these occur at intervals along the side of the shed. It is necessary that provision should be made for getting the intermediate conveyer portion past these as the conveyer system is moved along the length of the kiln. To conveniently effect this, a trolley support 33 is movable along a track 34 on brackets 35 carried by braces 36 on the shed posts 32, and carries a chain 37 or the like having a hook 38 at its lower end, this typifying any suitable means to temporarily engage some part on the conveyer portion 2 intermediate its length and support the same so that the interengaging portions 24, 25 can be disconnected, when the conveyer portion 2, after being freed from its connections at the delivery end, can be pushed outward and turned so as to get its end past the kiln posts and into the next section, where it can be again connected as before with the loading and delivery sections 1 and 3 respectively.

The loading conveyer belt 19 and the intermediate conveyer belt 22 are preferably driven from a common motor 39 suitably supported on the portion 1, by means of reducing gearing 40 which drives a shaft 41 having fixed thereto a drum 42 on which the belt 19 is looped. An adjustable takeup 43 to keep the belt 19 under proper tension may also be provided, this being suitably mounted in guides 44 and having an adjusting hand nut 45. Belt 19 is guided around a drum 46 at the outer end of portion 1 and around a drum or roller 47 at its other end, while its idle return portion may be supported on intermediate rollers 48. Driving impulse for the belt 22 is supplied by a pulley 49 fixed on the shaft 41, which by means of a sprocket chain or belt 50, double pulley 51, and a sprocket chain or belt 52, drives pulley 53, which has rigid therewith a drum 54 around which the belt 22 is looped. This belt likewise is provided with an adjustable take up 55 and suitable supporting rolls 56, 57 at the inner and outer ends respectively of its operative portion and with an intermediate supporting roll 58 for its return portion.

The bracket 26 at the outer end of the intermediate conveyer 2 is permanently adjusted at a suitable height relative to the railroad track, so that bricks will deliver therefrom by gravity to load the cars, and it is to be observed that this bracket support 26 virtually constitutes a pivot about which the intermediate conveyer portion can swing to maintain its connection with the loading portion 1, throughout its various vertical adjustments; likewise that this pivot point is movable horizontally transversely of the conveyer system along the track 29 to permit the conveyer system as a whole to be adjusted along the length of the kiln, also this pivot point is movable horizontally lengthwise of the conveyer system so as to permit the intermediate portion 2 to pass the several kiln shed posts 32, and allow for the vertical adjustment of portion 1.

The bricks as delivered by the conveyer belt 22 are received by the gravity delivery conveyer 3, which is preferably of the roller type and formed in sections, there being shown a short initial straight section 59, a section 60 curved to ninety degrees so as to bring the brick movement lengthwise of the car, and a series of straight sections 61 extending to an end of the car or to each part thereof as it is being loaded. The several conveyer sections are composed of side journal frames 62 and a series of rollers 63 pivoted therein, each section having at one end recesses 64 to receive pins 65 at the adjoining end of the next section, the sections thus interfitting to form a rigid and continuous conveyer. The rollers 66 of the curved conveyer portion are conical, as shown, and this portion is adapted to be reversed so as to extend from the door of the car in either direction so as to reach both ends of the car, its reversed position being shown in dotted lines at 67. This gravity conveyer, assembled as described, extends through the door of the car as shown at 68 and has suitable supports 69.

It is thus apparent that I provide an apparatus for loading bricks very rapidly, with a minimum of laborious effort and that there is no rough tumbling or other treatment calculated to injure the bricks. The loading portion of the conveyer can be quickly and easily brought to successive parts of the kiln from which the bricks are to be taken, and the supply of bricks to the gravity delivery portion is continuous and regular, so that the gravity conveyer operates to the best advantage, the gravity conveyer likewise performing its function quite undisturbed by the various adjustments of the loading portion 1.

The construction of the loading portion of the conveyer and the platform for the operative as a unitary bridge frame, provides a stand for the operative which is always in position where the loading is to be done, making it possible for the operative to constantly keep close to his work and get the bricks conveniently from the kiln onto the conveyer belt. The conveyer system being power operated from the loading point to the fixed elevation at the top of the gravity conveyer, insures the even and rapid delivery of bricks to the gravity conveyer irrespective of the vertical adjustment at the loading point, while the jointed intermediate conveyer portion with its movable fulcrum bracket 26 provides a continuous conveyer system throughout the various relative adjustments between the loading and the delivery portions of the apparatus. The gravity conveyer portion being in separable interlocked sections, can be extended to either extreme end of the car to deliver the bricks thereto, and as the end portion is filled, successive sections are removed up to the center of the car, when the curved section will be reversed and the operation repeated in filling the other end of the car. I believe it to be broadly new in brick loading to provide a conveyer system with a loading portion movable at will to the various parts of the kiln or other loading station in connection with a delivery portion, and provision to supply bricks thereto and deliver them therefrom without regard to the various adjustments of the loading portion. I also consider an important feature of the invention to reside in the combination of power driven conveyer mechanism on the vertically adjustable loading portion of the conveyer in connection with a gravity portion for receiving the bricks from the power operated portion and delivering the same to the car or other delivery point.

While the invention as a whole and its several features have been described with reference to the handling of bricks, and the apparatus is particularly well adapted for brick loading, this particular application of the invention is to be understood as merely illustrative and not restrictive, and the term "brick" as used in the specification and claims is intended to typify any of a wide range of articles or materials which may be handled by the mechanism set forth.

Having described my invention, what I claim as new and desire to secure by Letters Patent is, 1. A brick loading apparatus, comprising a vertically adjustable support carrying a horizontally extending conveyer belt for receiving bricks, means for adjusting said support vertically at both ends, means for driving said belt, a fixed delivery conveyer portion adapted to deliver to all the different parts of the receptacle being loaded, and an intermediate conveyer portion in jointed relation to the other conveyer portions to transfer bricks from one to the other.

2. A brick loading apparatus, comprising a vertically adjustable support carrying a horizontally extending belt for receiving bricks, means for adjusting said support vertically at both ends, an intermediate conveyer portion having a belt constituting a continuation of the conveyer path of said first belt, means for driving said belts, and a delivery conveyer portion adapted to deliver to all the different parts of the receptacle being loaded, said intermediate conveyer portion being mounted in jointed relation to the other portions.

3. A brick loading apparatus, comprising a vertically adjustable support carrying a horizontally extending belt constituting a receiving portion of a conveyer system, a gravity conveyer arranged to deliver bricks at the loading point, an intermediate conveyer portion having a belt constituting a continuation of the conveyer path of said receiving belt, said portion being mounted in flexible relation to the other portions, and power operated means connected to drive said brick-receiving belt and to operate said intermediate belt for conveying bricks to an elevation whence they may be delivered by gravity to the loading point.

4. An apparatus of the kind described, comprising a horizontally extending conveyer, constituting a brick-receiving portion of a conveyer system, means for adjustably suspending said conveyer at its ends from an overhead support, a platform for an operative in fixed relation to said conveyer extending along below the loading surface thereof and adjustable therewith, and means for delivering bricks from said conveyer to a determinate delivery point irrespective of the adjustment thereof.

5. A brick loading apparatus, comprising a conveyer supporting framework extending horizontally, means for adjusting the same vertically, a conveyer movable thereon, a platform fixed to said framework and extending lengthwise thereof, and means for delivering bricks from said conveyer to a determinate point irrespective of its adjustment.

6. An apparatus of the kind described, comprising a horizontally extending conveyer, supports for suspending the same at its ends with a capacity for vertical adjustment said supports being formed and separated the required distance to leave an unobstructed kiln space therebetween, and a subsequent conveyer having means for maintaining the delivery end thereof at a fixed elevation, there being a connection between the conveyers for automatically maintaining the receiving end of the subsequent con- tally extending conveyer irrespective of the vertical adjustments thereof.

7. An apparatus of the kind described, comprising a conveyer support having a movable conveyer extending horizontally thereon, means for suspending said support at its ends with a capacity for vertical and transverse horizontal adjustments from supports arranged and separated a suitable distance to leave an unobstructed kiln space between them, and a subsequent conveyer provided with means for maintaining its delivery end at a fixed elevation, there being a connection between said conveyers for automatically maintaining the receiving end of the subsequent conveyer in operative relation to said horizontally extending conveyer irrespective of the vertical adjustments thereof.

8. An apparatus of the kind described, comprising elevated horizontal trackways spaced apart the width of a kiln, a conveyer support mounted in depending relation to and movable along said trackways to operate in the open space between and below the same with provision for adjustment vertically with respect thereto, a horizontal conveyer movable on said support extending substantially through one dimension of the kiln space and adjustable through the extent of the other two dimensions thereof so as to be capable of being loaded from any part of the kiln space between said trackways, and a subsequent conveyer provided with means for maintaining its delivery end at a fixed elevation, there being a connection between the conveyers for automatically maintaining the receiving end of the subsequent conveyer in operative relation to the first conveyer irrespective of the vertical adjustments of the first conveyer.

9. An apparatus of the kind described, comprising trackways in separated relation to leave between them a kiln space, a conveyer movable along and mounted to depend from said trackways extending horizontally through substantially one dimension of the kiln space between said trackways and adjustable through the extent of the other two dimensions thereof horizontally and vertically, and a subsequent conveyer provided with means for maintaining its delivery end at a fixed elevation, there being a connection between said conveyers for automatically maintaining the receiving end of the subsequent conveyer in operative relation to the first conveyer irrespective of the vertical adjustments of the first conveyer.

10. An apparatus of the kind described, comprising elevated trackways mounted in separated relation to leave between them a kiln space, the supports for said trackways tire spaces therebetween open, a conveyer support extending horizontally between said trackways and supported therefrom for adjustment therealong through said kiln space and also for vertical adjustment, a conveyer movable on said support transversely of said trackways, and a subsequent conveyer provided with means for maintaining its delivery end at a fixed elevation, there being a connection between the conveyers for automatically maintaining the receiver end of the subsequent conveyer in operative relation to the first conveyer irrespective of the vertical adjustments of the first conveyer.

11. An apparatus of the kind described, comprising trackways mounted in separated relation along upper portions of upstanding supports to leave between them a kiln space, a conveyer support extending horizontally and secured at its ends in depending relation to said trackways for adjustment therealong and also vertically, a conveyer movable on said support transversely of said trackways, a platform for an operative extending along said support below the loading surface of the conveyer, and a subsequent conveyer mechanism arranged to receive bricks therefrom and to deliver the same to a determined point irrespective of the adjustments of said first conveyer.

12. A brick loading apparatus, comprising a horizontally extending, vertically adjustable receiving conveyer, a gravity delivery conveyer, and an intermediate power operated conveyer, arranged to elevate the bricks above the loading point and to swing about a movable support adjacent the top of said gravity conveyer and in continuous connection with said receiving conveyer throughout its adjustments.

13. A brick loading apparatus, comprising a horizontally extending vertically adjustable brick receiving conveyer, a gravity delivery conveyer, and an intermediate conveyer mounted to rest on and move about a vertically fixed support which is higher than the loading point and having continuous connection with said receiving conveyer throughout its adjustments.

14. A brick loading apparatus, comprising power operated conveyer mechanism having a loading portion extending horizontally and vertically adjustable, said mechanism having its delivery end at a vertically fixed point above the highest point to be loaded, a gravity conveyer having its top at said point and arranged to deliver bricks therefrom to the different parts of a car, and means mounted in flexible depending relation to an overhanging support for holding in connected relation the delivery end of said first named conveyer mechanism and the receiving end of said gravity conveyer.

15. A brick loading apparatus, comprising conveyer mechanism having a horizontally extending vertically adjustable receiving portion and said mechanism also having a vertically fixed delivery point, and automatic means for transferring bricks to said delivery point; and a gravity conveyer having its top at said vertically fixed delivery point and adapted to deliver the bricks to the different parts of a car.

16. A brick loading apparatus, comprising horizontally extending and vertically adjustable means for receiving bricks at different vertical elevations and delivering the same at a fixed elevation above the highest point to be loaded, a gravity conveyer arranged to receive the bricks so delivered, said gravity conveyer being formed in separable sections, and means for holding the receiving end of said gravity conveyer and the delivery end of the antecedent conveyer system in connected relation, said means being supported in flexibly depending relation from an overhead support.

17. A brick loading apparatus, comprising horizontally extending and vertically adjustable means for receiving bricks at different vertical elevations and delivering the same at a fixed elevation above the highest point to be loaded, a gravity conveyer for receiving the bricks so delivered, said gravity conveyer consisting of separable curved and straight sections adapted to be assembled so as to deliver bricks to different parts of a car, and means for holding the receiving portion of said gravity conveyer and the delivery portion of the antecedent system in connected relation, said means being mounted in depending relation to an overhead support.

18. A brick loading apparatus, comprising means for receiving bricks at different vertical elevations, a power conveyer system for delivering the same at a fixed elevation, a gravity conveyer for receiving the bricks so delivered, said gravity conveyer consisting of curved and straight separable roller sections, constructed to be assembled and interlocked in varied relations so as to deliver bricks to predetermined points, and means for holding the receiving portion of said gravity conveyer and the delivery portion of said conveyer system in connected relation, said means being mounted in adjustable depending relation to an overhead support.

19. A brick loading apparatus, comprising vertically adjustable power operated conveyer mechanism for receiving bricks at different elevations and delivering the same at a vertically fixed delivery point, means for adjusting said conveyer mechanism transversely of the line of conveyer movement, means for receiving the bricks from said delivery point and automatically transferring them to a loading point, and means for holding the receiving portion of said last named means and the delivery portions of said conveyer system in connected relation, said means being mounted in adjustable and flexible relation to an overhead support.

In testimony whereof, I have signed my name to this specification, in the presence of two subscribing witnesses.

WILLIAM W. WALLACE.

Witnesses:
C. P. MERTENS,
R. C. PENFIELD.